(12) United States Patent
Rau

(10) Patent No.: US 6,263,853 B1
(45) Date of Patent: Jul. 24, 2001

(54) RECIPROCATING PISTON ENGINE WITH HARMONIC BALANCING AND METHOD OF MAKING SAME

(75) Inventor: Erhard Rau, Weilheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/490,815

(22) Filed: Jan. 26, 2000

(30) Foreign Application Priority Data

Jan. 26, 1999 (DE) .............................................. 199 02 920

(51) Int. Cl.⁷ ................................................... F02B 75/06
(52) U.S. Cl. ......................... 123/192.2; 384/432; 384/503
(58) Field of Search ......................... 123/192.2; 384/432, 384/434, 503; 74/603

(56) References Cited

U.S. PATENT DOCUMENTS

| 4,509,378 | 4/1985 | Brown . |
| 4,926,810 | 5/1990 | Diehl et al. . |
| 5,775,817 | * 7/1998 | Gottemoller et al. ............... 384/434 |

FOREIGN PATENT DOCUMENTS

| 41 34 399 | 4/1992 | (DE) . |
| 195 35 497 | 3/1997 | (DE) . |
| 196 47 465 | 5/1998 | (DE) . |
| 0 851 132 A1 | 7/1998 | (EP) . |
| 95/28573 | 10/1995 | (WO) . |

* cited by examiner

Primary Examiner—Noah P. Kamen
(74) Attorney, Agent, or Firm—Evenson, McKeown, Edwards & Lenahan, P.L.L.C.

(57) ABSTRACT

A reciprocating piston engine with a crankshaft received in bearings includes a second-order harmonic balancer (Lanchester balancer) with one or more shafts received in bearings located in a crankshaft housing of the bearings of crankshaft and/or the bearings of the Lanchester shafts are made of at least one upper bearing part and a lower bearing part. At least the flange surfaces of the upper bearing parts and lower bearing parts have a fracture surface formed by cracking.

32 Claims, 5 Drawing Sheets

RECIPROCATING PISTON ENGINE WITH HARMONIC BALANCING AND METHOD OF MAKING SAME

BACKGROUND AND SUMMARY OF THE INVENTION

This application claims priority of 199 02 920.2, filed Jan. 26, 1999, the disclosure of which is expressly incorporated by reference herein.

The invention relates to a reciprocating piston engine with a crankshaft received in bearings and a first-order harmonic balancer and a secondary harmonic balancer (Lanchester balancer) with one or more shafts received in bearings being enclosed in a crankshaft housing and with the bearings of the crankshaft and/or the bearings of the Lanchester shafts consisting of at least one upper bearing part and one lower bearing part.

A drive device is already known for a motor vehicle with an engine, a crankshaft, and a transmission (German Patent Document DE 41 34 399 A1) which shows a crankshaft received in bearings and a first-order harmonic balancer as well as a second-order harmonic balancer, to which a plurality of shafts received in bearings belong that are received in a crankshaft housing. The bearing housing of the second-order harmonic balancer (Lanchester balancer) is connected releasably with the crankshaft housing of the crankshaft by a flange connection. The separate design of the suspended Lanchester housing leads to a considerable amount of work being involved in manufacturing the bearings of the crankshaft and the bearings of the Lanchester balancer, especially because the individual parts must be clamped very frequently when machining the bearings. A considerable amount of work is also required to machine the bearings to create a precise seat between the bearings of the crankshaft and/or bearings of the Lanchester balancer.

Accordingly, a goal of the invention is to design or manufacture the upper bearing part and the bearing cover and the lower bearing part of a shaft so that no finishing of the flange areas is required.

This goal is achieved according to the invention by virtue of the fact that at least the flange surfaces of the upper and lower bearing parts that abut one another have a fracture surface formed by cracking. As a result, the flange surfaces formed by cracking using this machining process need not be finished any further and the cracked flange surface makes possible very good attachment between the bearing parts to be joined.

It is also advantageous that, as already mentioned, the flange surfaces formed by cracking remain unfinished after cracking. Unevennesses and the roughened flange surfaces of the bearing parts that fit together permit a very accurate adjustment and hence an exact seat for the one bearing part to be mounted on the other bearing part.

An additional possibility according to an improvement on the device according to preferred embodiments of the invention is that the glagn surfaces formed by cracking have a small notch in the vicinity of their fracture for the cracking process. Notching or grooving can be performed by means of a laser and ensures that at the location of the groove during the fracturing process, in other words when the lower bearing part is broken off from the upper bearing part, a crack surface forms very precisely at this point which then corresponds to the flange surface of the bearing. If the two corresponding bearing parts are joined once again after the shafts have been installed, they can be adjusted in simple fashion since the two fracture surfaces or crack surfaces that belong together join again precisely. As a result, the bearing resume the same position as before the cracking process. The result is a very precise seat for the lower bearing part to joined to the upper bearing part.

In certain preferred embodiments of the invention, it is advantageous that the upper bearing part of the Lanchester shaft with which the lower bearing part is releasably connected, also has a flange surface or first crack plane formed by cracking and that, as already mentioned, the upper bearing part of the Lanchester shaft with its cracked flange surface abuts the cracked flange surface of the lower bearing part of the crankshaft.

According to certain preferred embodiments of the device according to the invention, provision is made such that the second crack plate or parting plane between the upper bearing part and the lower bearing part of the Lanchester shaft is formed for second-order balancing.

It is especially advantageous for certain preferred embodiments of the present invention to provide that the second crack plane of the flange surface of the upper bearing part and the lower bearing part correspond, the latter being in approximately the same plane as the parting plane between the crankcase and the crankshaft housing.

In conjunction with the design and arrangement according to certain preferred embodiments of the invention, it is advantageous for the crack surface to have a groove depth between 0.01 mm and 0.1 mm.

It is also advantageous according to certain preferred embodiments of the invention to provide that at least one lower bearing part of the bearing of the crankshaft is connected in one piece by means of one bearing of the Lanchester shaft or forms a structural unit. As a result, assembly time is reduced and the machining time for the bearing part is reduced since the workpiece needs to be clamped only a few times.

It is also advantageous according to certain preferred embodiments of the invention to provide that the one-piece part with the lower bearing part of the bearing of the crankshaft is connected on one side to an upper bearing part of the crankshaft and a lower bearing part of the Lanchester shaft is attached on the other side.

It is also advantageous in this respect according to certain preferred embodiments of the invention to provide that the one-piece part of the crankshaft, in addition to the two top bearing parts for the two Lanchester shafts, has an additional lower bearing part for a third Lanchester shaft.

Other objects, advantages and novel features of the present invention will become apparent from the following detailed description of the invention when considered in conjunction with the accompanying drawings

DETAILED DESCRIPTION OF THE DRAWINGS

Figure 1:
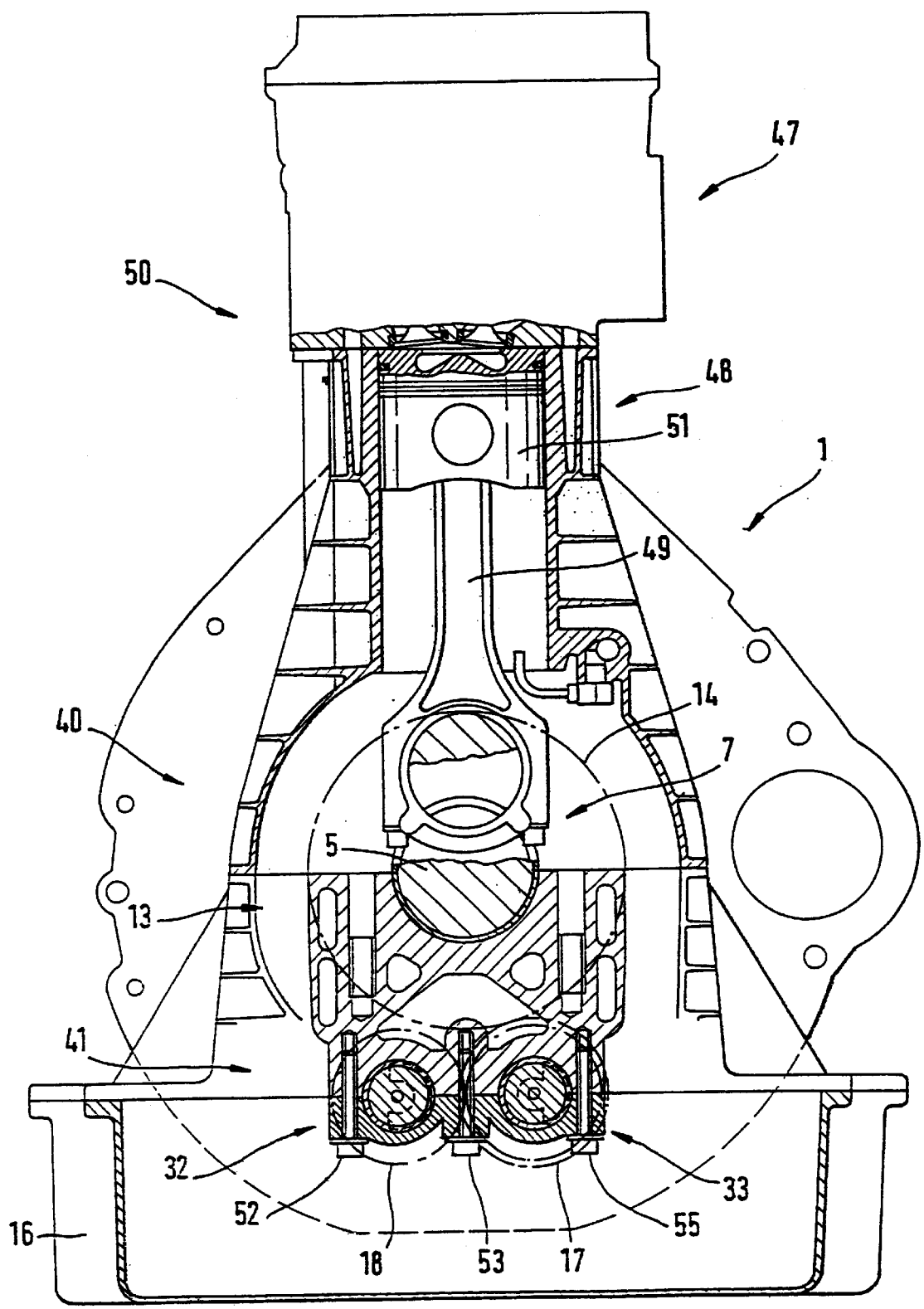
FIG. 1 is a lengthwise section through a reciprocating piston engine with a crankshaft received in bearings and a second-order harmonic balancer (Lanchester balancer), constructed according to preferred embodiments of the present invention.
Figure 5:
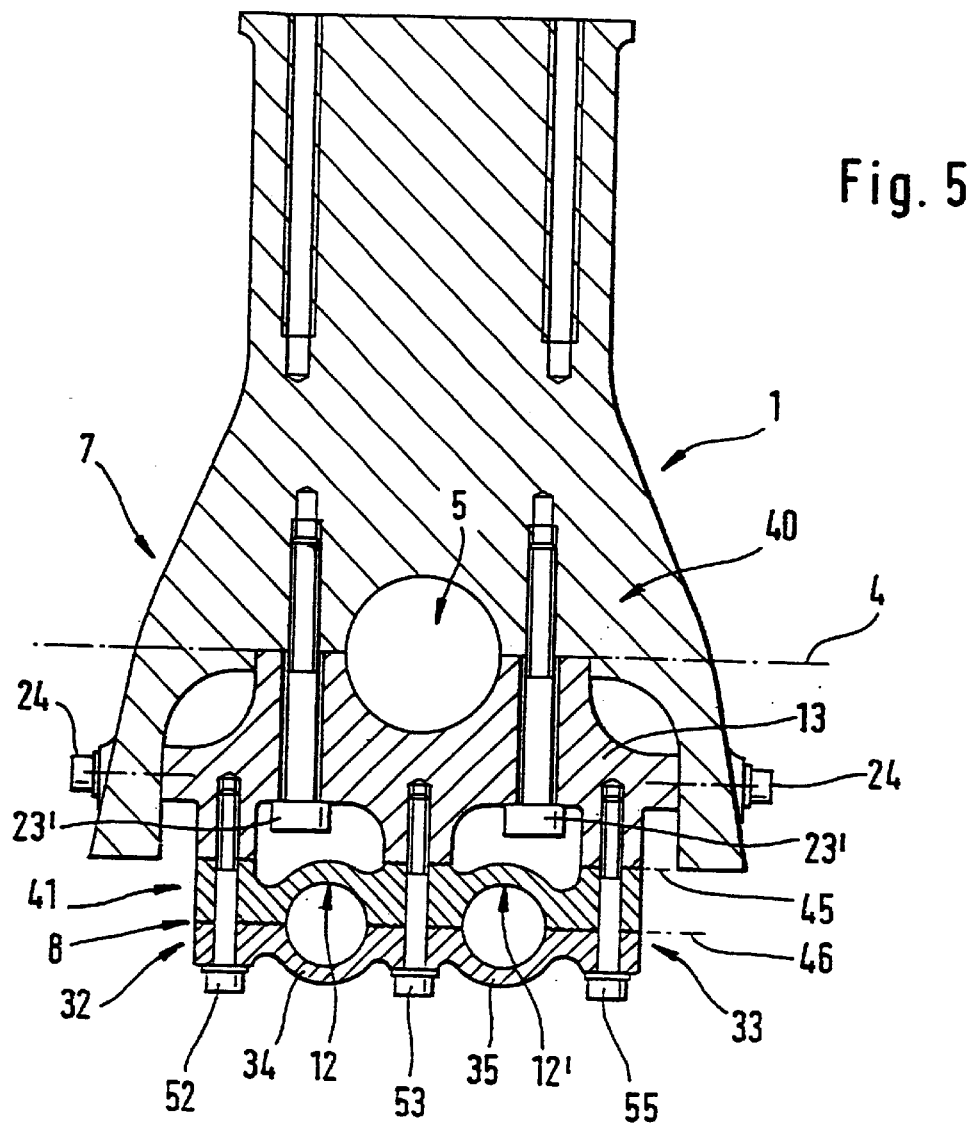
FIG. 5 is a section through another embodiment of the design of the bearings of the crankshaft and the Lanchester shaft with two crack planes for a four-cylinder engine.
Figure 6:
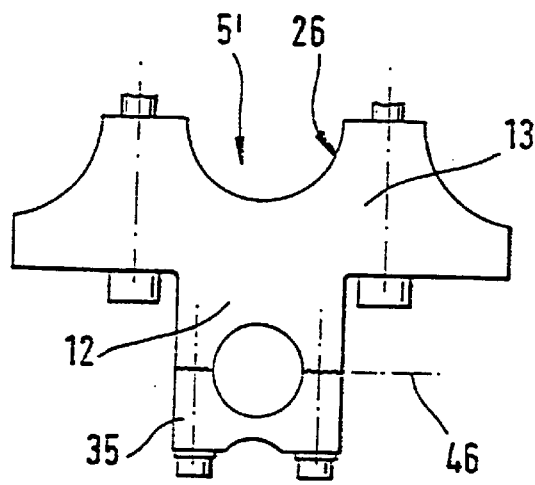
FIG. 6 is a schematic view of an embodiment of an invention having a part with an integrated lower bearing part for the crankshaft and an upper bearing part for a Lanchester shaft and a crack plane.

In the drawing, 50 represents a reciprocating piston engine which can be designed for example as a three- or four- cylinder engine and includes a crankshaft housing 1 that has a cylinder block 48 in FIGS. 1 and 5 to which a cylinder head 47 is fastened by tie bolts 23. Crankshaft housing 1 contains a connecting rod 49 which is connected at its upper end to a piston 51 and is connected at its other end with a crankshaft 5.

Figure 3:
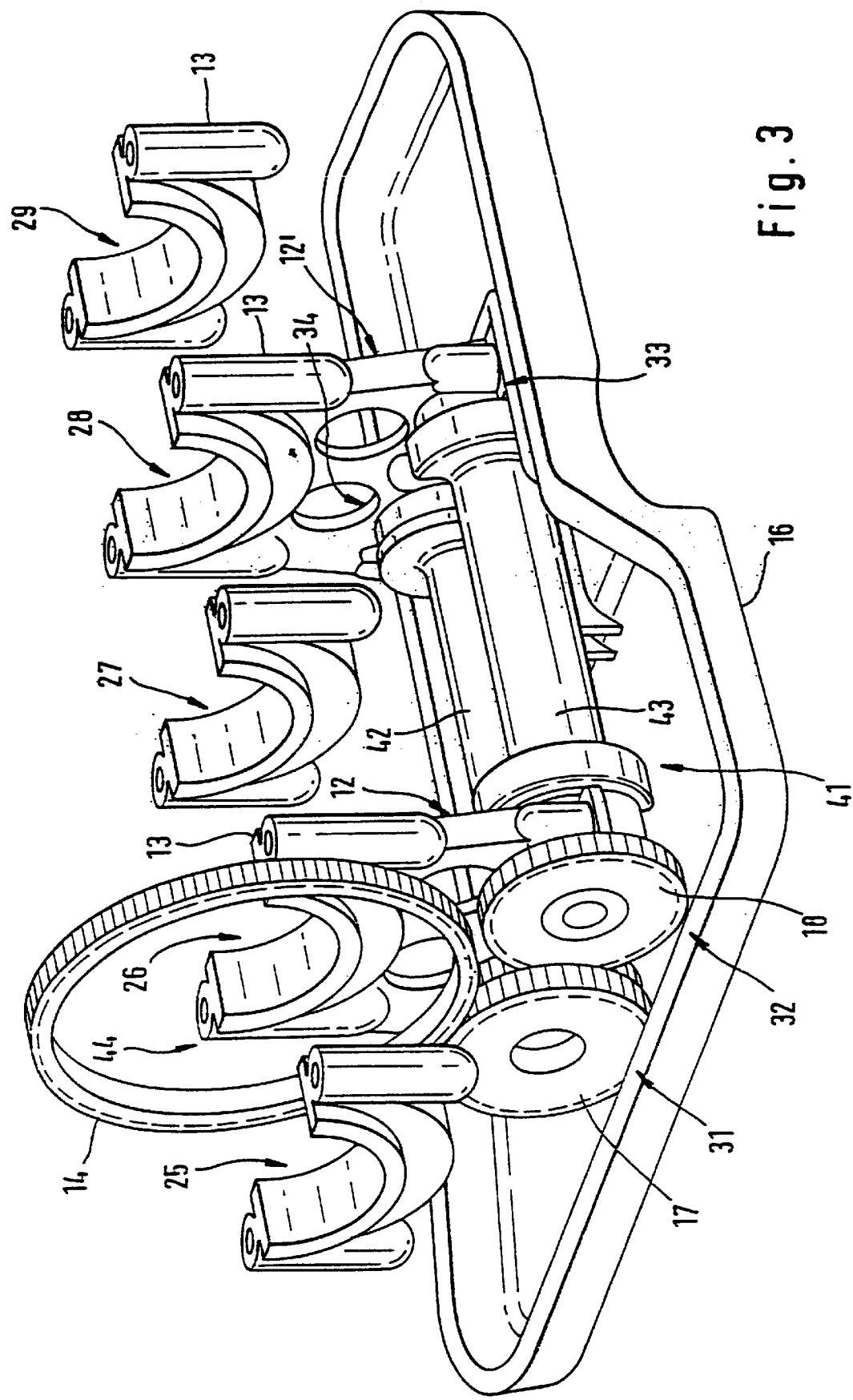
FIG. 3 is a perspective view of the arrangement of FIG. 1 showing individual lower bearing parts to receive crankshaft, with the second-order harmonic balancer having two shafts.

Crankshaft housing 1 contains a harmonic balancer 40 associated with crankshaft 5 and a second-order harmonic balancer 41 (Lanchester balancer) shown in particular in FIG. 3.

In FIG. 3, crankshaft 5 is omitted and only its bearings 25, 26, 27, 28, and 29 are shown. Bearings 25 to 29 are releasably connected by the bolts shown in FIGS. 1 and 2 and tie bolts 23 with upper bearing parts 7 and cylinder head 47 (see FIG. 1) or with parts of the crankshaft housing 1.

The individual bearings 25 to 29 are therefore each formed by one upper bearing part 7 and by one lower bearing part 13 to receive crankshaft 5.

The bearing surfaces 7 and bearing covers can be made of a similar material with coefficients of thermal expansion similar to that of crankshaft 5. Lower bearing part 13 and the bearing seats of crankshaft 5 can likewise be made of a similar material with the same coefficients of thermal expansion as crankshaft 5. For example, it is possible to select GGG, sintered aluminum, or other connecting materials. The lower bearing parts 26 and 28 shown in perspective in FIG. 3 are connected in one piece with an upper bearing part 12 or 12' of the second-order harmonic balancer. Lower bearing part 26 or 28 and upper bearing part 12, 12' therefore form a structural unit 44. Structural unit 44 made of parts 26 and 12 is likewise releasably connected with cylinder head 47 by tie bolts23 shown in FIGS. 1 and 2.

The second-order harmonic balancer (Lanchester balancer) 41 has shafts 42 and 43 that run parallel to one another, said shafts being received rotatably in bearing shells 34 and 35 which are releasably connected by bolts 52, 53, 55 with lower bearing part 13.

The Lanchester shafts 42 and 43 are driven according to FIG. 3 by a gear drive. For this purpose, a drive gear 14 is located on crankshaft 5 that meshes with a first drive gear 17 and a driven gear 18 of the second-order harmonic balancer. Lanchester shafts 42 and 43 are located slightly above a crankcase 16. Drive gear 14 is nonrotatably mounted on crankshaft 5 while drive gear 17 is on Lanchester shaft 42 and the driven gear 18 is mounted nonrotatably on Lanchester shaft 43. The two Lanchester shafts 42 and 43 extend parallel to one another in a transverse horizontal plane 8.

Figure 2:
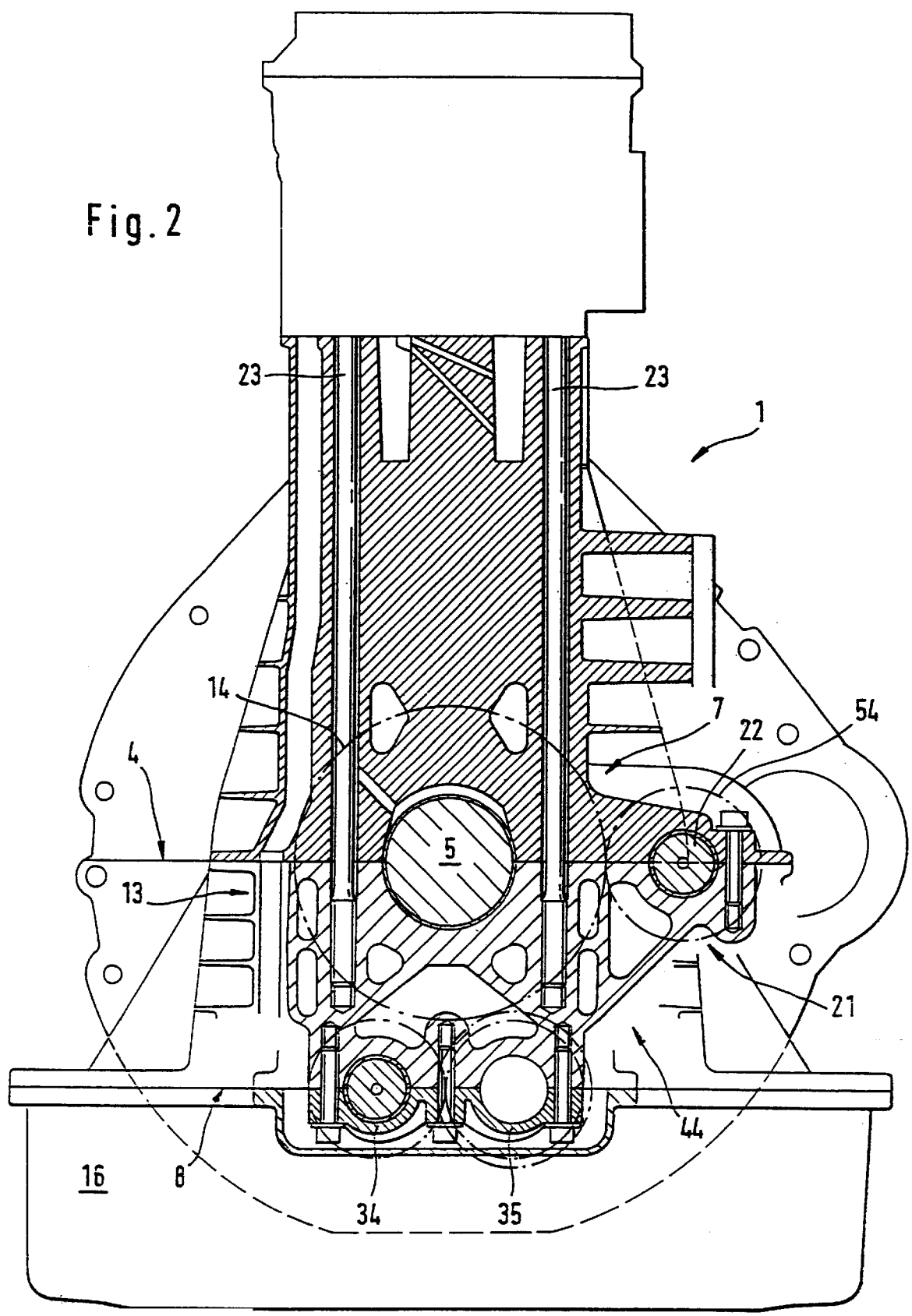
FIG. 2 is a view similar to FIG. 1, showing a second embodiment of a reciprocating piston engine with a second-order harmonic balancer, with the second-order harmonic balancer having three shafts.

According to an additional embodiment according to FIG. 2, the second-order harmonic balancer can also consist of at least three shafts 42, 43, 22, with the drive gear 14 driving directly by a gear 54 mounted on the third shaft 22. The third shaft 22 is located at approximately the same level as bearings 25 and 29 of crankshaft 5, in other words in a horizontal transverse plane 4.

Drive gear 14, as already mentioned, is also in a driving connection with the drive gear 17 of shaft 42, said connection in turn driving shaft 43 through drive gear 18.

A lower bearing part 21 of the third shaft 22, together with the corresponding upper bearing parts 12 of the two shafts 42 and 43 that run parallel to one another, likewise forms a one-piece structural element 44 that is releasably connected by tie bolts 23 according to FIGS. 1 and 2 with upper bearing part 7 as well as cylinder head 47.

Figure 4:
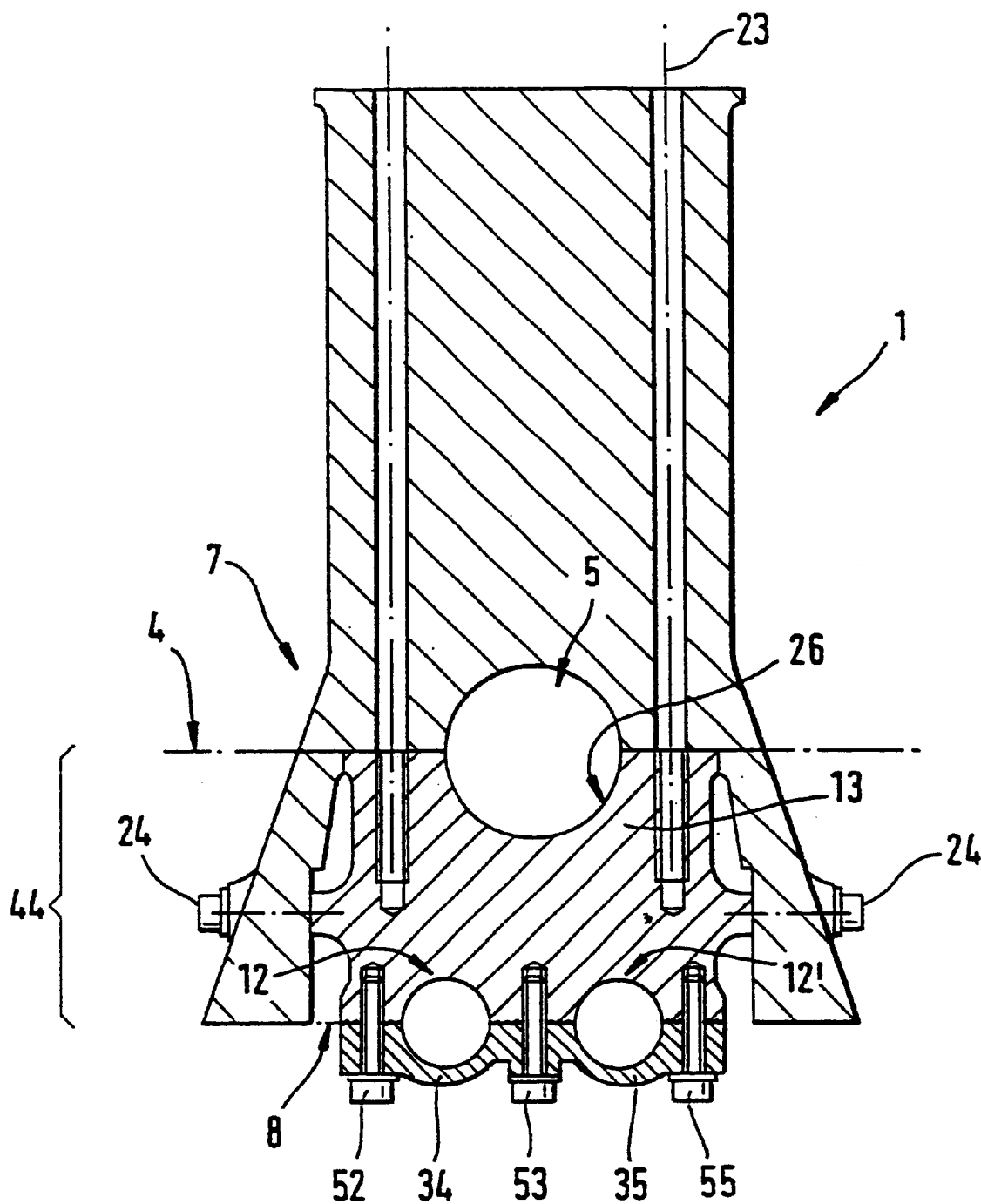
FIG. 4 is a section through a part of the crankshaft housing with a one-piece upper bearing part and lower bearing part.

The one-piece parts 44 of Lanchester shafts 42, 43, and 22 according to FIG. 4 can be connected by transverse threaded elements 24 with the lower part of crankshaft housing 1.

It is advantageous for the opposite flange surfaces of lower bearing part 13 and the lower bearing part 12, 12' to form a flange surface 45 created by cracking which is also referred to as the first crack plane (I) (FIG. 5).

A new crack plane 46 (II) runs between the flange surfaces of upper bearing part 12, 12' and lower bearing part 34, 35 of Lanchester shafts 42 and 43.

As a result, the flange surfaces formed by cracking or the flange surfaces 45 of upper bearing parts 12, 12' and lower bearing part 13 do not have to be finished any further following this work step. The cracked flange surface permits very good attachment between the bearing parts to be connected.

For the cracking process or the separating process of lower bearing part 13 of crankshaft 5 from upper bearing part 12, 12' a notch or groove is produced by a laser or by mechanical machining in the vicinity of the point at which the lower bearing part is to be broken away. Consequently, this ensures that at the location of the notching or grooving in the fracturing process, in other words when the upper bearing part 12, 12' is broken away from the lower bearing part 13 or during the breaking away of lower bearing part 34, 35 from upper bearing part 12, 12', a crack surface forms precisely at this spot which then corresponds to the flange surface 45 or 46 of the upper bearing or bearing cover 12, 12' and lower bearing part 13, 34, 35.

After the cracking process, if the bearing parts that belong together are fitted together once again, they can be adjusted in simple fashion since the two fracture surfaces or crack surfaces that belong together will again fit together precisely at the parting location. As a result, the bearing resumes the same position as before the cracking process. This produces, without any final adjustments, a very exact seat for lower bearing part 13, 34, 35 to be joined to upper bearing part 12, 12'.

In the four-cylinder engine according to FIG. 5, the lower bearing part 13 of crankshaft 5 is releasably connected by short screws 23 with crankshaft housing 1. Upper bearing part 12, 12' and lower bearing part 34, 35 of Lanchester shafts 42 and 43 are releasably connected to lower bearing part 13 by screws 52 and 53, Second crack plane 46 already mentioned is between lower bearing part 13 of crankshaft 5 and upper bearing part 12, 12' of Lanchester shafts 42 and 43

In another embodiment, a four-cylinder engine (FIGS. 2, 3) is shown is section. From these drawing figures, it can be seen that crankshaft 5 and the five bearings 25 to 29 that are in a row are each releasably connected by simple screws 23 with a cylinder head 47, and in this embodiment only the second and fourth lower bearing parts 13 form a structural unit 44 with upper bearing parts 12 and 12'. In addition, according to this example, shaft 43 can be a second-order harmonic balancer (Lanchester balancer) while first shaft 42 is designed as a smooth shaft with no harmonic balancer.

It is also possible for drive gear 14 to be designed as a chain gear and to be in a driving connection with one of the drive gears of shaft 42 through a tension means, not shown.

Parting line or plane 8 between crankcase 16 and crankshaft housing 1 lies in approximately the same transverse horizontal plane as the transverse plane that runs through the two shafts 42, 43. Parting line 8 between upper bearing parts 12, 12' of the one-piece part 44 and the lower bearing parts 34, 35 of the Lanchester balancer lie in the second crack plane 46. Crack plane 46 can also be located slightly above or below the parting line 8 between crankcase 16 and crankshaft housing 1.

It is also advantageous of every point of separation between the individual bearings to be deigned as a crack area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reciprocating piston engine comprising:
   a crankshaft received in bearings,
   a first-order harmonic balancer associated with said crankshaft,
   a second-order harmonic balancer to which balancer shafts received in a pair of said bearings belong, said crankshaft and said balancer shafts being received in a crankshaft housing, each of the pair of said bearings defining one upper bearing part and one lower bearing part, and
   a bearing shell connected to said one upper bearing part, wherein said one lower bearing part, on which the crankshaft is received, is connected together with said one upper bearing part and forms a structural unit,
   wherein flange surfaces located between said one upper bearing part and said bearing shell abut one another and define fracture surfaces formed by cracking.

2. The engine according to claim 1, wherein the one upper bearing part and the bearing shell are releasably connected, and wherein the one upper bearing part and the one lower bearing part define additional flange surfaces in a crack plane therebetween.

3. The engine according to claim 2, wherein each flange surface is fractured in a vicinity of a small notch.

4. The engine according to claim 3, wherein said structural unit has an additional lower bearing part for a third shaft of the second-order harmonic balancer.

5. The engine according to claim 3, wherein each flange surface remains unmachined after cracking.

6. The engine according to claim 5, wherein the structural unit is connected, on one hand, by the one lower bearing part, to an upper bearing part which receives said crankshaft and, on the other hand, with said bearing shell which receives said balancer shafts.

7. The engine according to claim 6, wherein said structural unit has an additional lower bearing part for a third shaft of the second-order harmonic balancer.

8. The engine according to claim 5, wherein said structural unit has an additional lower bearing part for a third shaft of the second-order harmonic balancer.

9. The engine according to claim 3, wherein the structural unit is connected, on one hand, by the one lower bearing part, to an upper bearing part which receives said crankshaft and, on the other hand, with said bearing shell which receives said balancer shafts.

10. The engine according to claim 9, wherein said structural unit has an additional lower bearing part for a third shaft of the second-order harmonic balancer.

11. The engine according to claim 2, wherein each flange surface remains unmachined after cracking.

12. The engine according to claim 11, wherein the structural unit is connected, on one hand, by the one lower bearing part, to an upper bearing part which receives said crankshaft and, on the other hand, with said bearing shell which receives said balancer shafts.

13. The engine according to claim 12, wherein said structural unit has an additional lower bearing part for a third shaft of the second-order harmonic balancer.

14. The engine according to claim 11, wherein said structural unit has an additional lower bearing part for a third shaft of the second-order harmonic balancer.

15. The engine according to claim 2, wherein the structural unit is connected, on one hand, by the one lower bearing part, to an upper bearing part which receives said crankshaft and, on the other hand, with said bearing shell which receives said balancer shafts.

16. The engine according to claim 15, wherein said structural unit has an additional lower bearing part for a third shaft of the second-order harmonic balancer.

17. The engine according to claim 2, wherein said structural unit has an additional lower bearing part for a third shaft of the second-order harmonic balancer.

18. The engine according to claim 1, wherein each flange surface is fractured in a vicinity of a small notch.

19. The engine according to claim 18, wherein each flange surface remains unmachined after cracking.

20. The engine according to claim 19, wherein the structural unit is connected, on one hand, by the one lower bearing part, to an upper bearing part which receives said crankshaft and, on the other hand, with said bearing shell which receives said balancer shafts.

21. The engine according to claim 20, wherein said structural unit has an additional lower bearing part for a third shaft of the second-order harmonic balancer.

22. The engine according to claim 19, wherein said structural unit has an additional lower bearing part for a third shaft of the second-order harmonic balancer.

23. The engine according to claim 18, wherein the structural unit is connected, on one hand, by the one lower bearing part, to an upper bearing part which receives said crankshaft and, on the other hand, with said bearing shell which receives said balancer shafts.

24. The engine according to claim 23, wherein said structural unit has an additional lower bearing part for a third shaft of the second-order harmonic balancer.

25. The engine according to claim 3, wherein said structural unit has an additional lower bearing part for a third shaft of the second-order harmonic balancer.

26. The engine according to claim 1, wherein each flange surface remains unmachined after cracking.

27. The engine according to claim 26, wherein the structural unit is connected, on one hand, by the one lower bearing part, to an upper bearing part which receives said crankshaft and, on the other hand, with said bearing shell which receives said balancer shafts.

28. The engine according to claim 27, wherein said structural unit has an additional lower bearing part for a third shaft of the second-order harmonic balancer.

29. The engine according to claim 26, wherein said structural unit has an additional lower bearing part for a third shaft of the second-order harmonic balancer.

30. The engine according to claim 1, wherein the structural unit is connected, on one hand, by the one lower bearing part, to an upper bearing part which receives said crankshaft and, on the other hand, with said bearing shell which receives said balancer shafts.

31. The engine according to claim 30, wherein said structural unit has an additional lower bearing part for a third shaft of the second-order harmonic balancer.

32. The engine according to claim 1, wherein said structural unit has an additional lower bearing part for a third shaft of the second-order harmonic balancer.

\* \* \* \* \*